(12) United States Patent
Guyomarc'h

(10) Patent No.: US 7,591,982 B2
(45) Date of Patent: Sep. 22, 2009

(54) THERMAL WASTE RECYCLING METHOD AND SYSTEM, AND APPLICATION THEREOF IN THE TREATMENT OF WASTE WITH A HIGH WATER CONTENT

(75) Inventor: Raymond Guyomarc'h, Saint Theodorit (FR)

(73) Assignee: BIO 3D Applications, Paris (FR)

( * ) Notice: Subject to any disclaimer, the term of this patent is extended or adjusted under 35 U.S.C. 154(b) by 357 days.

(21) Appl. No.: 10/556,921

(22) PCT Filed: May 13, 2004

(86) PCT No.: PCT/FR2004/001162
§ 371 (c)(1),
(2), (4) Date: Sep. 25, 2006

(87) PCT Pub. No.: WO2004/101452
PCT Pub. Date: Nov. 25, 2004

(65) Prior Publication Data
US 2007/0173679 A1   Jul. 26, 2007

(30) Foreign Application Priority Data
May 14, 2003   (FR)   ................. 03 05794

(51) Int. Cl.
*B01J 8/04*   (2006.01)
*B01J 10/00*   (2006.01)
*B01J 19/18*   (2006.01)
*F23C 9/00*   (2006.01)
*B09B 1/00*   (2006.01)

(52) U.S. Cl. .............. 422/188; 422/187; 422/189; 422/193; 422/194; 422/195; 422/228; 422/232; 422/233; 422/236; 422/239; 110/210; 48/197 R; 48/197 A

(58) Field of Classification Search ................. 422/187, 422/188, 189, 193, 194, 195, 228, 232, 233, 422/236, 239; 110/210, 211, 219, 221, 224, 110/225, 229, 248; 48/197 R, 197 A, 204
See application file for complete search history.

(56) References Cited

U.S. PATENT DOCUMENTS

| | | |
|---|---|---|
| 4,361,100 A | 11/1982 | Hinger |
| 4,507,127 A | 3/1985 | Hirose |
| 4,557,204 A | 12/1985 | Faehnle |
| 4,724,776 A * | 2/1988 | Foresto ................ 110/235 |
| 4,890,563 A | 1/1990 | White et al. |
| 5,917,138 A | 6/1999 | Taylor |
| 6,398,921 B1 | 6/2002 | Moraski |

FOREIGN PATENT DOCUMENTS
JP   56022389   3/1981

* cited by examiner

Primary Examiner—Walter D Griffin
Assistant Examiner—Lessanework Seifu
(74) Attorney, Agent, or Firm—Greer, Burns & Crain, Ltd.

(57) ABSTRACT

A thermal waste recycling system and method and to the application thereof in the treatment of high-water-content waste includes: a column for thermal waste pyrolysis, a thermal pyrolysis gas combustion chamber, a thermal purification and molecular cracking device, a heat exchange device comprising a condensation device and an element-concentration device, a device for the condensation of carbonic gas $CO_2$, a device for cooling the hot parts of the system, and a cogeneration installation.

40 Claims, 4 Drawing Sheets

H = height of the grate in relation to the height of the preheating/filtration layer

THERMAL WASTE RECYCLING METHOD AND SYSTEM, AND APPLICATION THEREOF IN THE TREATMENT OF WASTE WITH A HIGH WATER CONTENT

BACKGROUND

The present invention relates to a system for recycling waste, in particular waste with a high water content. It is also aimed at the method used in this system.

The treatment of waste with a high water content, such as sludge from wastewater treatment plants and livestock slurries currently constitutes a great problem for operators of these installations and for the local authorities. Growing environmental concerns make it necessary to find effective and economically viable solutions to this problem.

The purpose of the present invention is to propose a waste recycling system allowing the problem of the treatment of waste, and most particularly of waste with a high water content, to be solved.

SUMMARY OF THE INVENTION

This objective is achieved with a thermal waste recycling system, comprising:
means for thermal pyrolysis of waste,
means for combustion of the non-gasified solids (thermal pyrolysis carbons),
means for combustion of the thermal pyrolysis gases,
means for thermal purification and molecular cracking,
heat exchange means comprising condensation means and means for the concentration of elements,
means for condensation of the carbon dioxide $CO_2$
means for cooling down hot sections of said system, and
means for cogeneration.

The system according to the invention can advantageously comprise means for dehydration of the wet waste. Moreover, it is kept under a controlled low pressure in order to prevent any gaseous concentration.

In a particular form of the invention, the thermal pyrolysis means comprise:
a solid-fuel furnace, with an ascending flow, comprising a grate receiving the fuel, which constitutes the regulating thermal base on which the thermolysis/pyrolysis carbons are totally reduced, and oxidant injectors,
a thermolysis/pyrolysis column, for heat acquisition for gasification of the volatiles contained in the waste, and
a chamber for homogenization of the flue gases and combustible volatiles.

The solid fuel can for example comprise end-of-life waste wood, or treated wood contaminated with chemical elements or compounds.

The oxidant injected into the furnace is preferably oxygen, but it can also be atmospheric air.

The solid-fuel furnace in practice has an ashpit arranged under the grate, in order to receive ash and non-gasifiable heavy metals.

The system according to the invention can also advantageously comprise means for the hydraulic cooling of the walls of the furnace, its grate and the walls of the ashpit, and air tight means for supplying the furnace with solid fuel.

The thermolysis/pyrolysis column can comprise pipes inclined towards the furnace and which are heat controlled.

The inclination of the tubes is determined as a function of a desired flow velocity and the density of the materials to be burned.

In one embodiment of the invention, the homogenization chamber ends in a nozzle adjusted to the required flow rates, the end of which discharges into a combustion chamber for the thermal pyrolysis gases. Means are provided to vary the flow rate of the gas in the nozzle.

The means for combustion of the thermal pyrolysis gases advantageously comprise:
a cylindrical combustion chamber having an approximately parabolic bottom in which the gas nozzle discharges, this bottom comprising means for injecting oxygen $O_2$,
an afterburner downstream of the combustion chamber, ending in a duct for transferring the flue gas to the thermal purification and molecular cracking means.

The thermal purification and molecular cracking means can comprise:
a first, so-called thermal reactor zone,
a second, so-called stabilization and expansion zone, and
a third, so-called afterburning zone.

The first, so-called thermal reactor zone, is in the form of a chamber comprising two parts divided by a first inclined grate receiving solid fuel [Bio-D], the upper part containing an incandescent ember bed, oxygen $O_2$ injectors arranged under said first grate introducing the primary oxidant, oxygen $O_2$ injectors arranged above said first grate supplying the reactor itself with oxidant, and the lower part situated under said first grate being the chamber for admission of the flue gasses to be purified (as well as the combustible volatiles to be reduced and the steam to be purified), and comprising an ashpit in its lower section.

The second, so-called stabilization and expansion zone, is in the form of a double chamber comprising two distinct compartments separated by a vertical non-continuous partition, the first compartment being constituted by the upper part situated above the first grate and communicating with the second compartment via the free opening above the partition.

The flow of the gases in this part is ascending, and it is into this part that the solid fuel [Bio-D] feed chute discharges above the first grate.

The second compartment is constituted by the upper part situated above the second grate, the flow of the gases in this compartment being reversed (descending). This part comprises in its base a second grate, oppositely inclined to the first grate and below the latter, the two grates communicating via the free opening situated at the base of the partition wall, the fuel as embers flowing via this communication of the first to the second grate.

The third, so-called afterburning zone, comprises oxygen $O_2$ injectors, arranged under said second grate. These injectors introduce the afterburning oxidant. This afterburning zone comprises an ashpit in its lower section.

The heat exchange means are arranged so as to carry out a condensation/solidification of the elements (reduced to the native state by molecular cracking) contained in the exhaust gas coming from the thermal purification means, and a condensation of the water at low temperature and at a pressure lower than the atmospheric pressure.

The heat exchange means also include low pressure means arranged to keep the water contained in the exhaust gas, in the state of dry steam up to its condensation pressure-temperature zone.

A secondary exchanger, downstream of the heat exchange means, operating as an evaporator for the liquid oxygen, cools down the exhaust gases and allows condensation of the steam, means for recovering the water condensed by gravity preventing the entry of any additional air.

The means for condensation of the carbon dioxide comprise refrigeration systems specified by the oxygen supplier.

In a particular embodiment, the means for dehydration of the wet waste comprises:
 a closed container for receiving the materials to be dehydrated,
 means for lifting up the wet materials, comprising an inclined container, heated and maintained under a strong low pressure by an extractor/compressor for drawing up the vapours and injecting them into the thermal reactor means,
 means for transferring the dehydrated materials to a waste feed chute.

The dehydration means can also comprise means for injecting hot gases so as to heat the lifting means and evaporate the water contained in the materials.

The cooling means are for example installed in the space inside a double wall provided for the cooling of zones of the system in contact with the hot sources of said system.

According to another aspect of the invention, a method for thermal waste recycling is proposed, used in the system according to any one of the preceding claims, this method comprising:
 a phase of thermal pyrolysis of the waste,
 a phase of combustion of the carbons and thermal pyrolysis gases,
 a phase of thermal purification and a molecular cracking,
 a heat exchange phase comprising a phase of condensation and concentration of elements,
 a phase of condensation of the $CO_2$ gas, and
 a phase of cogeneration This method can also comprise a prior phase of dehydration of the wet waste.

BRIEF DESCRIPTION OF THE DRAWINGS

Other advantages and characteristics of the invention will become apparent on examination of the detailed description of an embodiment which is no way limitative, and the attached drawings in which.

DETAILED DESCRIPTION OF THE PREFERRED EMBODIMENT

Figure 1:
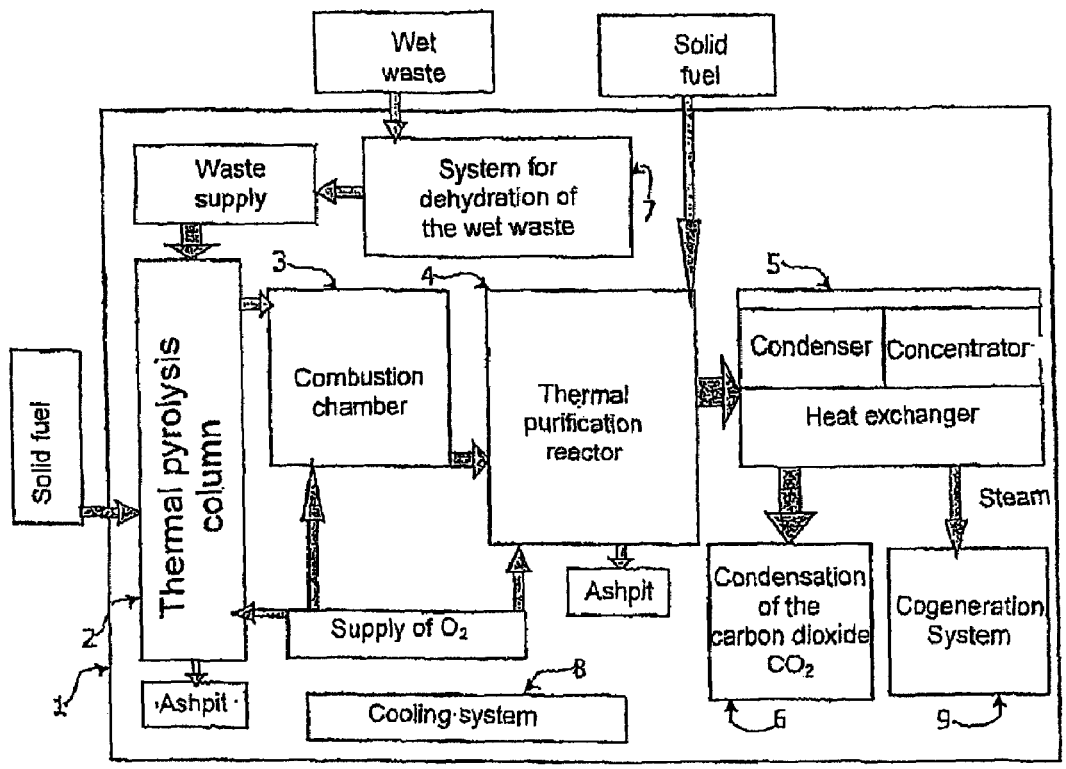
FIG. 1 is a block diagram of the thermal recycling system according to the invention.

There will now be described with reference to the above-mentioned figures an embodiment of a recycling system according to the invention together with the method used in this system.

The thermal recycling system 1 comprises seven distinct, concomitant and communicating parts:
 a thermal pyrolysis column 2,
 a combustion chamber 3 for the thermal pyrolysis gas,
 a thermal purification and molecular cracking reactor 4,
 a heat exchanger 5 comprising a condenser and an element concentrator,
 a system 6 for condensing carbon dioxide $CO_2$,
 a system 7 for dehydrating wet waste,
 a hydraulic cooling system 8, and
 a cogeneration system 9.

The method according to the invention is continuous, with interactive and simultaneous operation. The thermal recycling system 1 is kept at controlled low pressure to avoid any concentration of gases.

Figure 2:
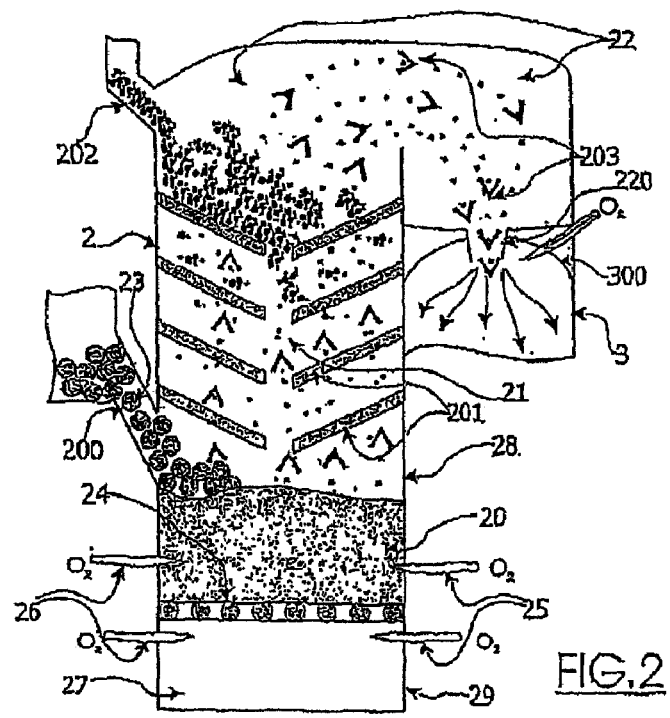
FIG. 2 diagrammatically illustrates the structure of a thermal pyrolysis column used in the thermal recycling system according to the invention.

The thermal pyrolysis column 2 comprises three zones with reference to FIG. 2:
 a solid-fuel furnace 20,
 a thermolysis/pyrolysis column 21,
 an homogenization chamber 22 for homogenizing flue gases and volatile fuels.

The solid-fuel furnace 20, with ascending flow, comprises a grate 24 receiving the fuel and accommodating the oxidant injectors 25, 26.

The solid fuel 23 can be end-of-life waste wood, treated wood polluted by the chemical elements CCA (copper, chromium, arsenic), HAP or PCP creosotes (wood treated with organochlorines) and/or improved biomass known as [Bio-D].

The [Bio-D]-type solid fuel marketed by the applicant, by its nature free from any pollutant, is used only in the final process of the system: purification/breaking down into elements of the combustion gas. The size of the solid fuel must correspond to the use to which it is put.

In the method according to the invention, the oxygen can be used as sole oxidant for the combustion of the solid fuel, in particular the fuel [Bio-D].

The role of the solid fuel here is to be a regulating thermal base, completely impenetrable by the solid fuel bodies (waste carbon after thermal pyrolysis). Its thickness is suitable for the expected functions.

Its temperature rises to between 1500 and 1600° C., which allows the waste carbon to be fully burned and the fusions which have taken place in the column to flow.

In this zone, the oxidant is preferably $O_2$, but it can be "atmospheric" air enriched with $O_2$ or not. The gases originating from this zone are purified and cracked as they pass through the reactor.

The injection of the oxidant is forced. It is carried out firstly under the grate and secondly at the heart of the thermal base. A very reactive, easily controllable incandescent bed is thus obtained.

This furnace of standard design is made of special steel in order to allow very high temperatures, typically 1600° C., to be obtained.

Under the grate 24, an ashpit 27, airtight due to a slight excess pressure of $CO_2$, receives the non-combustible residues:
 ashes composed essentially of minerals contained in the fuel and the incinerated waste.
 non-gasifiable heavy metals . . . .

The walls 28 of the system, its furnace grate 24, the tubular grates 201 and the walls 29 of the ashpit 27 are hydraulically cooled in order to maintain their nominal use temperature, typically 1200° C.

An airtight chute 200 is arranged above the furnace 20 for supplying the solid fuel. This supply is continuous and controlled in order to avoid any entry of additional air.

The thermolysis/pyrolysis column 2 constitutes a high-volume zone suitable for heat acquisition for gasification of the volatile substances contained in the waste.

The tubular grates 201, inclined towards the furnace and thermally controlled, are arranged in this space to slow down the waste chute and permit a progressive heat acquisition.

The inclination is relative to the flow speed desired, according to the density of the materials to be incinerated. The atmosphere of this zone is reducing. It is continuously monitored in order to eliminate any possibility of residual oxygen. The thermal base is continuously monitored and controlled in order to:

provide the required thermal capacity for the volatilization of gasifiable organic material contained in the waste,
   ensure complete combustion of the thermal pyrolysis carbons,
   guarantee the total absorption of the oxidant oxygen.

The waste feed chute 202 is situated above the tubular grates. It is airtight and controlled by a forced flow of $CO_2$ in order to avoid any entry of additional air. It is via this chute that the dry material originating from slurries and liquid manures is introduced.

A percentage of solid fuel injected into the waste feed chute facilitates its constant flow and declogging of the grates of the column.

In the method according to the invention, waste with a high energy potential, waste tyres, animal meal, etc., will be introduced via this chute into the thermolysis/pyrolysis column 2. The elimination of this waste will provide energy which is useful for the dehydration of slurries and liquid manures.

The homogenization chamber 22 for the flue gases 203 and volatile fuels ends in a nozzle 220 suitable for the flow rates required. A hydraulic system allows the gas flow in this nozzle to be varied. It acts on the pressure drops and monitoring of the thermal capacities in play in the column. The end of the nozzle opens into the combustion chamber for the thermolysis gas. At this level the gases contain no trace of $O_2$ and are at an average temperature of 1400° C.

Figure 3:
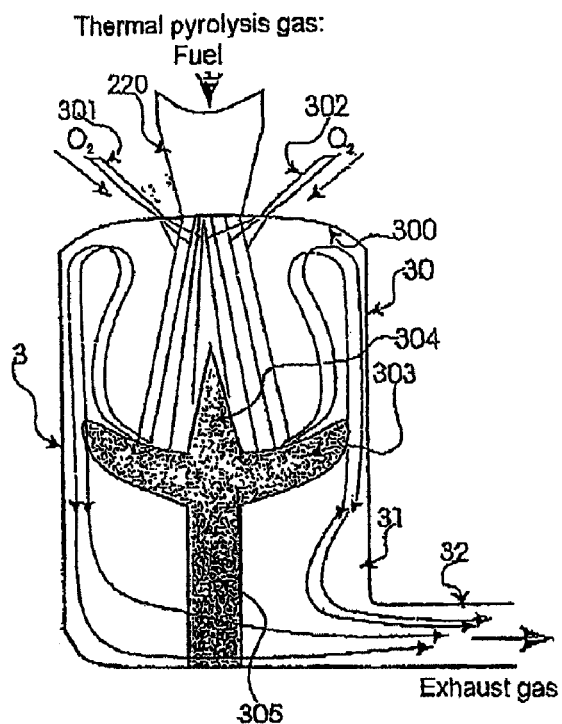
FIG. 3 diagrammatically illustrates the structure of a combustion chamber used in the thermal recycling system according to the invention.

The combustion chamber 3 for the thermolysis gas is a space comprising three zones, with reference to FIG. 3:

a first zone 30 constituting a cylindrical combustion chamber with a parabolic base 300 into which the gas nozzle 220 opens,
   a second zone 31 constituting an afterburner which is a continuation of the first combustion chamber,
   a conduit 32 at the end of the afterburner which transports the flue gas towards the thermal purification and molecular cracking reactor.

The parabolic base 300 is provided with $O_2$ injectors 301 and 302 which allow instant ignition of gases as soon as they enter the chamber.

Opposite the nozzle, a parabola 303, with a diameter less than the cylinder of the chamber, is provided with a central cone 304. The function of this assembly is to send the gases back and create turbulence so as to homogenize their combustion.

The distance between the base of the chamber and the parabola is relative to the waste treatment capacity of the system. The temperature of this zone reaches values close to 2000° C., the walls and the parabola are regulated by a hydraulic cooling system.

The ignited gases pass to the periphery of the parabola when the system is at low pressure, continuously regulated and controlled. The gases are expanded in this cylindrical chamber which comprises the support nozzle 305 of the parabola in its axis.

The volume of the afterburner is determined by the technical characteristics of the overall system, the aim being the complete combustion of the gases. The atmosphere of this chamber is controlled in terms of composition, temperature, pressure and speed. The aim is not to have residual oxygen at the outlet of the exhaust gases.

Figure 4:
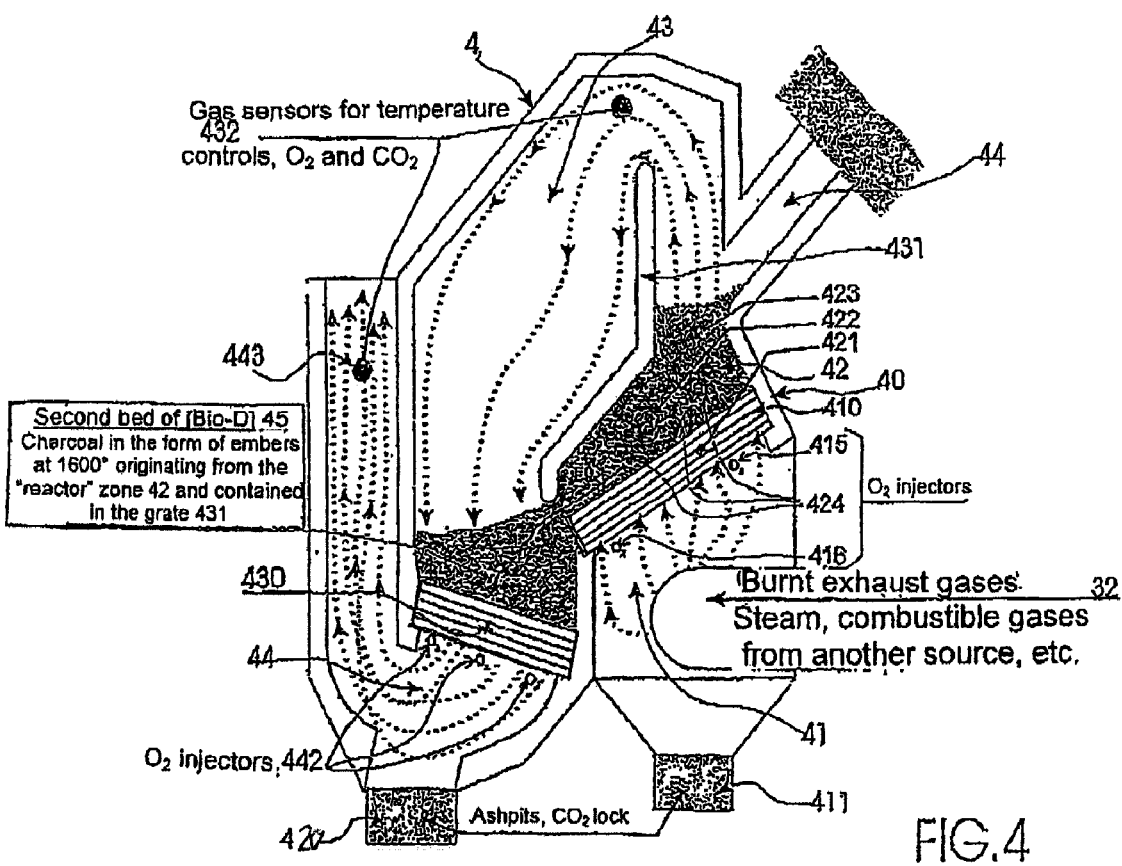
FIG. 4 diagrammatically illustrates the structure of a thermal purification reactor used in the thermal recycling system according to the invention.

The thermal purification and molecular cracking reactor 4 comprises, with reference to FIG. 4, three zones:

a first zone 40, called the thermal reactor,
   a second zone 43, for the stabilization and expansion of the treated gas,
   a third zone 44, for afterburning.

Figure 5:
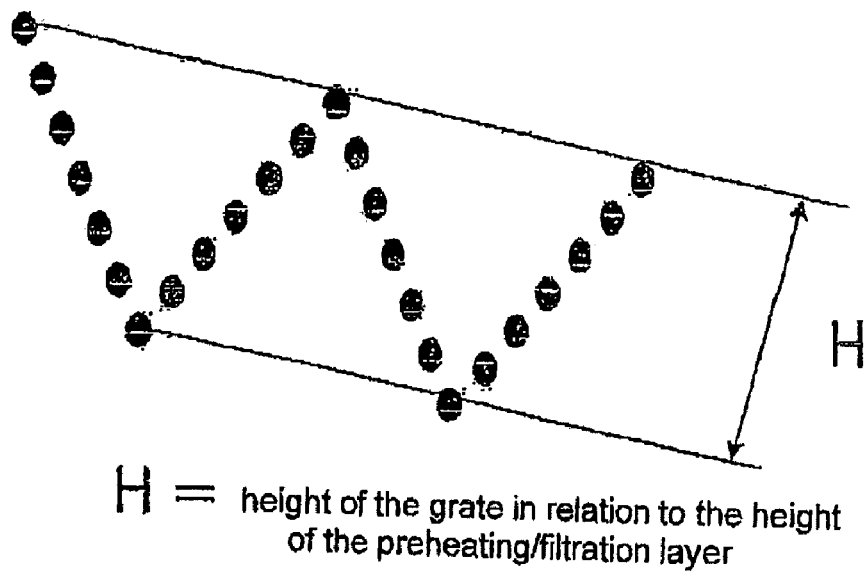
FIG. 5 diagrammatically illustrates the structure of a dehydration system used in the thermal recycling system according to the invention.

The thermal reactor zone 40 consists of a chamber divided into two spaces by a first inclined tubular grate 410 which receives only the solid fuel [Bio-D]. With reference to FIG. 5, this grate is inclined in the direction of the length of the tubes, the section of the grate forms an accordion the height of the folds of which form the preheating layer 421.

The upper space 42 is contained in this grate and is configured to form a first incandescent bed suitable for the technical features of the general system.

This bed is designed to form three distinct layers:

a first layer 421, for pre-heating and filtration, which is contained by the grate 410, and the thickness of which is the height of said grate,
   a second layer 422, called the thermal reactor, which is defined by the technical features of the initial method and which is contained in the shape of the space 42,
   a third layer 423, formed by the fuel [Bio-D] supplied continuously by the chute 44.

It is this third layer, in an endothermic phase, which regulates the oxygen and ensures that it is completely consumed before the entry of the gas treated in zone 42.

Injectors 424 propel the oxygen to the heart of the second layer, which constitutes an ignition material, to form the thermal reactor which filters and reduces the gas to be treated. They are designed to provide the oxidant necessary to continuously keep the temperature of the reactor at 1600° C.

The second space 41 is situated below the grate 410, the conduit 32 carrying the gas coming from the combustion chamber discharges here. It is into this space that gases to be purified and cracked are injected and the steam originating from the dehydration system 7. The injectors 415 and 416 supply primary oxygen to the first [Bio-D] bed.

The bottom of the first grate 410 communicates with the second grate 430 which is the base of the second space of the zone 43 for stabilization and expansion. The 50%-consumed solid fuel (which is then pure charcoal in state of embers at more than 1600° C.) flows via this communication of the grate 410 onto this second grate 430. This second grate is configured like the first, it is inclined in an opposite direction that of the thermal reactor.

The system used for thermal purification and molecular cracking is called a "Reducing Action Filter" (RAF). It is a system for treating hot or cold charged and polluted flue gases and industrial gases.

The RAF system is designed to carry out the integral filtration of gaseous effluents and the thermal cracking of compound molecules. The RAF system, designed as a thermal generator for solid fuel, is configured for the utilization of solid fuel [Bio-D] which, burned at a very high temperature under pure oxygen, constitutes the fluid and permanent ember beds.

Gaseous effluents pass through these very reactive ember beds: flue gases, degassings, various treated air emissions, exhaust gases of industrial systems, etc.

Thus a reactor is provided which thermally reduces the gas polluted with native elements, regardless of their temperature or of the type of pollution.

The operating principle exploits all the available oxygen molecules, whether supplied or existing in the effluent. These molecules combine to $CO_2$ with the carbon elements, accelerating the heat transfer of the heart of the reactor.

The gases at the outlet are now only composed of $CO_2$ and of non-combined native elements, at this stage of the method, there is no longer any $O_2$. The hydrogen contained in the gases participates in the heat generation and combines to $H_2O$.

Oxygen injectors 415, 416, situated under the first grate 410 "thermal reactor" supply the primary oxygen to the solid fuel. The flue gases are introduced into this part 41 of the chamber, through the conduit 32, and are mixed with the primary oxygen. In this zone the direction of the flow of gas is ascending.

This gaseous mixture passes through the "reactor 42" where they are subjected to violent reducing thermal shocks. It is in this part 41 of the chamber that the steam and the combustible gases originating from the treatment of the waste with a high water content are injected.

An ashpit 411 is situated under this chamber part, it receives the exclusively mineral ash contained in the solid fuel, approximately 0.5% of the mass consumed. The air tightness of the ashpit is guaranteed by a slight excess pressure caused by an injection of $CO_2$.

Above the thermal reactor zone 42, a chute 44 supplies it with solid fuel. It is air tight and controlled by a forced flow of $CO_2$, in order to prevent the entry of any additional air. This supply is continuous and controlled in order to maintain the characteristics of this zone.

At this level, the gases are at a minimum temperature of 1600° C., they are broken down into elements. They contain no residual oxygen, this state being ensured by the continuous supply of solid fuel which consumes more of it than is available. There is no longer an injection of oxygen at the level of the chute 44. Control means 432 installed at the outlet of this zone ensure this absence of residual $O_2$ by acting on the supply of oxidant to the reactor.

The zone 43 for stabilization and expansion of the treated gas, is divided into two parts by a partition 431. This partition allows at its apex the communication between the parts of the zone 43, a space at the bottom of this partition ensures the flow of the embers from the grate 410 to the grate 430. The two spaces of the zone 43 have a reversed direction of flow. The first part situated below the so-called reactor zone 42 is in an ascending state of flow. The second part, separated from the first by the partition 431 is in a reverse descending flow.

A second bed 45 of [Bio-D] solid fuel (densified biomass) is the base of this second zone. The fuel is contained by the second grate 430 with the same configuration as the first. Its inclination is opposite to the first, it is situated below the latter. It is pointed out that these grates communicate with each other through the bottom of the partition 431 and the bottom of the first grate, which discharges above the second.

This bed 45 is composed of embers of solid fuel originating from the first bed, being more than 50% consumed these are embers of charcoal. These embers flow by gravity from one bed to the other, their flow is naturally regulated by the consumption of material.

At this level there is still no supply of oxidant. These solid fuels are maintained in the state of live embers by the portion of oxygen which passes through the communication. This supply being insufficient, they are therefore in a reducing phase. As they are at around 1600° C., the solid fuels are extremely inflammable.

The treated gas, which is broken down into elements, is charged with particles of charcoal when crossing this bed, the purpose of this is to enrich it with combustible materials before the afterburning, and to provide a strong energy potential for the third afterburning zone.

This afterburning zone 44 is situated immediately under the second grate 430, where $O_2$ injectors 442 are installed. The injection of oxidant at this location instantly ignites the charcoal particles carried along by the gas which has been broken down into elements. At this location the temperature can reach 2000° C. This zone is defined and configured in order to carry out the complete combustion of the charcoal particles.

The control of the oxygen, at the outlet of this zone, allows the combustion to be regulated so that it is strictly stoichiometric.

An ashpit 420 is situated under this chamber part, it receives the exclusively mineral ash contained in the solid fuel, approximately 0.5% of the mass consumed. The air tightness of this ashpit is guaranteed by a slight excess pressure caused by an injection of $CO_2$.

The exhaust gas is composed of $CO_2$, $H_2O$ in the high temperature dry steam state and native elements contained in the treated waste. This gas is drawn up towards the heat exchanger where it loses all the thermal energy it contains.

The assembly 5 heat exchanger/element concentrator condenser is designed according to a prior analysis of the waste treated by the system.

This analysis allows determination of:
the elements contained in the waste and their physicochemical characteristics,
the quantity of steam to be condensed,
the volume of $CO_2$ which will be produced, and
the volume and the nature of the elements which can neither be condensed nor solidified.

The exchanger 5 can then be defined and configured so as to preserve "landing" zones. The purpose of these zones is to allow for the conditions for the change of state of the elements. The heat exchange can be carried out according to a technique allowing the temperature of the exhaust gas to be maintained and controlled at the level required.

The coolant is for example water which is brought to the state of superheated steam and at very high pressure during the heat exchange. This steam serves to produce the cogeneration which provides the energy used in the method, the excesses are marketable.

The system which ensures the low pressure in the method, and the means used to control it, allow the water, contained in the exhaust gas to be maintained in the state of dry steam, even at low temperature. This state allows the phase change of a maximum of the native elements contained in the gas and their recovery, before condensation of the water.

The condensation of the water contained in the exhaust gas is carried out at low temperature and below the atmospheric pressure. This state, together with the drawing up of the gas which increases the low pressure as the water condenses, ensures that it is pure water which is recovered by gravity.

The elements, still gaseous at these temperatures, and the carbon dioxide $CO_2$ are drawn up by the system which ensures the low pressure in the method. They are slightly compressed by this same system in order to be introduced into the $CO_2$ condensation cycle.

The device 6 for condensation of the carbon dioxide is an integral part of the thermal recycling system 1 according to the invention. It comprises material means for lowering the temperature of the exhaust gas to the $CO_2$ condensation temperature, approximately −80° C.

For this purpose, a secondary exchanger, which is installed at the end of the previous cycle, serves as an evaporator for the oxygen liquid. It draws the energy which aids the evaporation of the $O_2$ from that available in the exhaust gas. The heat capacity which remains to be extracted in order to condense the $CO_2$, is extracted by a standard refrigeration system, its power relates to the technical characteristics of the general system. The refrigerating means can be the cryonics system which provides the oxygen for the method, if one is installed.

The condensation device 5 is configured in such a way that, during the cycle of cooling the exhaust gas, the residual elements, which can be condensed before the $CO_2$, are recovered.

According to the case and the aims, the temperature can be lowered to a lower level in order to complete the condensation/recovery of other elements.

The residual gaseous elements are harmless and they can be returned to the ecosystem. Otherwise their volume is reduced to the smallest portion, they can then be neutralized, for example vitrified. The energy needed for the thermal recycling system is provided by the cogeneration generated by the general system.

Figure 6:
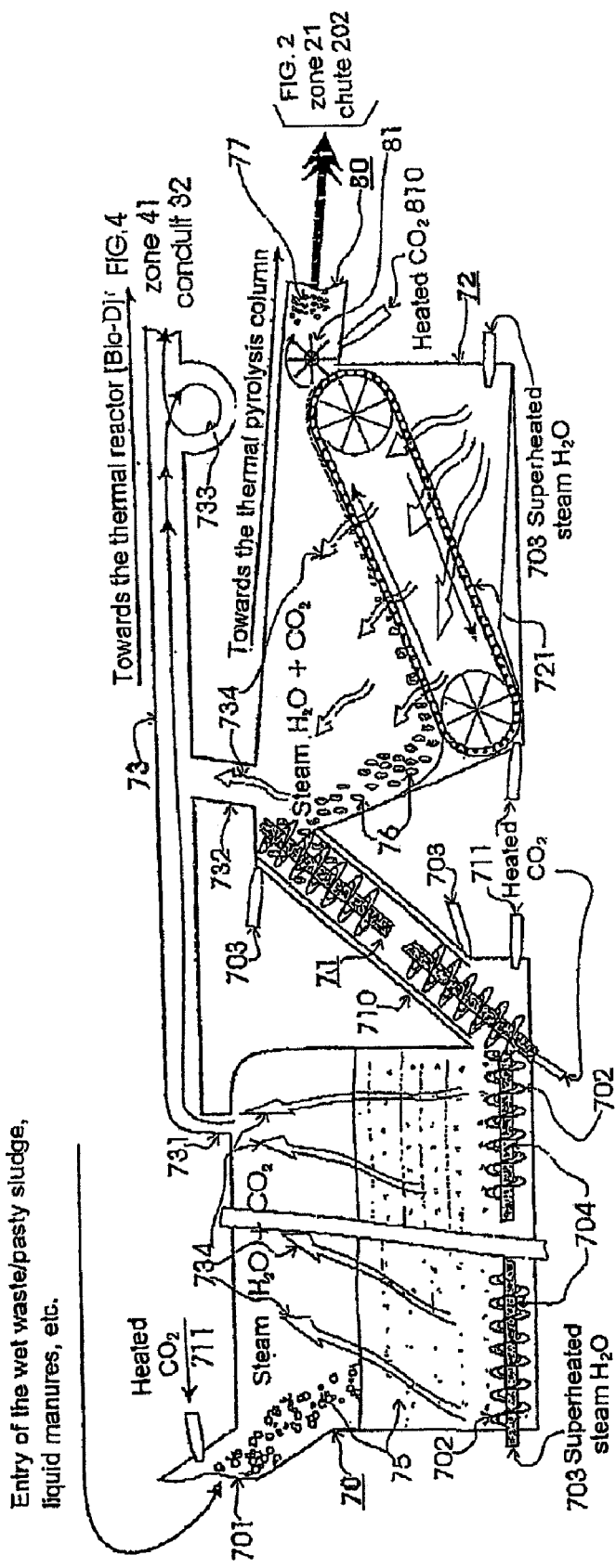
FIG. 6 diagrammatically illustrates the structure of a dehydration device suitable for use with the present system.

The dehydration device 7 used in the thermal recycling system according to the invention comprises, with reference to FIG. 6, three parts, the volumes and technical characteristics of which are defined according to the quantities of wet materials to be treated:
   a closed tank 70 which receives the materials to be dehydrated via a chute, transfer means, unloading lock,
   a mechanism 71 for lifting up and pre-drying of the wet materials, and
   a dehydrator/transfer device 72 for the dry materials.

The materials to be dehydrated can be delivered by truck if the thermal recycling system according to the invention is at a distance from the production site. If the system is installed on the site, the tank is then directly accessible at the outlet for the materials. The materials are introduced into the tank by a chute 701. This chute is maintained under a slight excess pressure by an injection of heated $CO_2$ originating from the general system.

At the base of this tank 70, a screw conveyor 702 conveys the stored materials 75 towards a mechanism 71 provided in order to lift them up into a dehydration area.

The tank 70 is heated by superheated steam 703 produce inside the general system for thermal recycling according to the invention. Introduced via the perforated shaft 704 of the screw conveyor, the steam raises and maintains the temperature of the tank 70 at a maximum of 60° C. The volume of this tank is kept at a slightly low pressure by a vent 731. A continuous drawing up conveys the extracted vapours to the thermal reactor device. This extraction is carried out by an exhauster/compressor 733 which draws up the vapours produced in the general dehydration system via a conduit 73 and injects them into the thermal reactor device.

The mechanism 71 for lifting up the wet materials is composed of an inclined with a double wall 710, this tank is heated by superheated steam 703 which circulates in the double wall.

In the inclined tank 710, a screw conveyor 71 lifts up the wet materials. It is configured in such a way that only pre-dried materials arrive at the top. The shaft of this screw is perforated in order to allow the injection of heated gas along the whole length of this tank. A system of pipes injects heated gases 711 ($CO_2$ originating from the general system) which heats the mechanism 71 and the internal volume of the tank 710 so as to evaporate the water contained in the materials. This space is maintained at a very low pressure by the exhauster/compressor 733 which draws up the vapours 734 through a vent 732 and injects them into the thermal reactor device.

The materials are stirred by the screw 702 and 71, which prevents their agglomeration and facilitates the evaporation of the water that they contain. The steam, the injected heated gases and the gases 734 evaporated by these operations, are continuously drawn up and injected into the thermal reactor device.

The pre-dried materials 76, lifted up by the mechanism 71, are introduced into the dehydrating tank 72 which is the third part of this system. An inclined conveyor belt 721 fills the space in this tank, it is micro-perforated in order to allow the passage of heated gases 711 and 703 which will complete the dehydration of the materials. This conveyor belt receives the pre-dried materials 76 so as to lift them up to the chute 80. The materials occupy the surface of the conveyor belt 721 through which the heated gases pass in order to complete the dehydration.

The heated gases 711 and 703 complete the evaporation of the materials 76. The steam and the gases 734 are drawn up by the exhauster/compressor 733 via the vent 732 and injected into the thermal reactor device via the conduit 73.

The upper part of this conveyor belt 721 opens onto the chute 80 which communicates with the chute 202 described in FIG. 2 zone 21 (supplying the thermal pyrolysis column 2 in FIG. 2 with waste). This chute 80 is maintained under excess pressure by an injection 810 of inert heated $CO_2$ gas which ensures that it is impossible to draw up gas originating from the thermal pyrolysis column.

A rotating scraper 81 removes the dried materials at the top of the conveyor belt 721. The materials are broken up 77 by the scraper which propels them into the chute 80 from where they flow by gravity towards the thermal pyrolysis column. According to the configuration of the general system, a transfer mechanism can continue the transfer of these materials to the thermal pyrolysis column.

An embodiment of a cooling system 8 used in the thermal recycling system according to the invention will now be described.

This cooling system is designed on the principle that reduction of the heat exchange, which at minimum is viable for the materials, facilitates obtaining and controlling the temperatures of the methods, and reduces energy consumption. The method used in this cooling system uses water stabilized as regards minerals and pH, and is permanently recycled.

The principle of the method is to substitute the mass of coolant, used in a standard fashion, with a system for spraying atomized water at high pressure. This system is installed in the space inside a double wall reserved for cooling of the zones in contact with the sources of heat.

The system is composed of a network of pipes which transport the pressurized water. The pressure is relative to the flow rates required for the regulation and control of the various zones to be controlled. Installed on the external partition (cold) of the double wall, this network of pipes forms a framework which stiffens the structure, which allows the thickness of this partition to be reduced.

This network of pipes is installed in any manner on one or the other face of the wall according to the general configuration of the recipient equipment.

Taps cross these pipes in places according to the thermal zone to be controlled. Nozzles or injectors, pointing towards the wall to be cooled are installed on the end of these taps. The control of these taps is electric and progressive, with micrometer adjustment and automatic, computer-controlled control. These taps can be removed while the pipe is under pressure, for maintenance without shutting down for technical reasons.

The water is micronized as it passes through the nozzles. It is sprayed at high pressure, in full conical jets in the volume comprised in the internal space onto the external face of the partitions subjected to a release of heat which is to be controlled. These characteristics ensure the impact of the droplets at all the spots on the walls to be controlled, whatever the configuration of the equipment, and ensure the wetting power of the sprayed water.

This system allows the supervision, control and modulation of the temperatures of walls subjected to a heat flow or to significant thermal conductivity. In particular if the intensity of this release of heat is greater than the physico-chemical resistance of the materials employed.

Each thermal zone is provided with a detector system, comprising contact sensors which allow continuous monitoring of the temperature of the wall to be regulated.

The system operates by control of the taps and regulates the flow rate of the water spray and allows the temperature of the wall to be controlled by varying this flow rate.

The volume comprised in the double wall is at low pressure thanks to a steam exhauster/compressor. This consequently allows instantaneous evaporation, at low temperature, of the water spray as soon as it makes contact with the wall to be controlled and limits the thermal shocks.

The quantity of latent heat absorbed by the system allows better control of the required temperature by the heat exchange needed for the wall, while only using the required quantity of liquid, and allows the removal of only the excess quantity of energy.

The thickness of the wall in contact with the heat flow can be reduced to a minimum mechanical strength, the equilibrium of the pressures on both sides of these walls being stable. The reduction of the thicknesses optimizes the heat exchange and the efficiency of the temperature control.

This state allows the production of installations with a better heat exchange and reduced maintenance charges. The wall in contact with the heat flow can be produced as a cladding so as to be interchangeable. The structure and the load-bearing wall of the control system are not subjected to any stress, their maintenance is reduced and their service life is extended.

Spraying the water on the wall to be thermally controlled facilitates its instantaneous evaporation. The spraying at high pressure ensure a perfect and measured wetting of the walls to be controlled, no matter where it is situated or positioned in the equipment configuration.

This state allows precise targeting of the zone of action of each jet and instantaneous apportioning of their power as a function of the necessary heat absorption. Each tap can be automatically micrometrically adjusted and digitally controlled. It corresponds to one or more jets depending on the zone to be controlled. Each sensitive zone can therefore be specially treated. The pressure of the pipe assembly allows jets which can be precisely directed and allows zones which are difficult to cool to be reached.

The spraying at high pressure of the atomized water accelerates its evaporation. This instantaneous evaporation absorbs large quantities of thermal energy in a reduced lapse of time. Sensors distributed at every sensitive point allow the temperatures required to be managed as much as possible thanks to their action on the real-time regulation of the flow rate of water of the zone with which they are concerned. This cooling system guarantees the homogeneity of the temperature of the walls of the space of heat release by instantaneously reacting to all fluctuations in these releases.

This reduces to the minimum the stresses to which the materials used are exposed, while minimizing the thermal shocks, and affording them a longer service life.

The water is distributed by a network of pipes fixed onto the external wall of the casing of the heat exchanger. The pressure of the water in this network can be significant without damaging the strength of the walls. On the contrary, these pipes help to strengthen the support of the wall.

The pressure can be adjusted to the required flow rates, the apportioning of a flow rate for each injector is more easily controlled. The advantage of this pressure capacity is the introduction of the required flow rates at any point in the zones to be treated, allowing the atomization of the water, forcefully spraying this atomized water and thus encouraging its micronization which ensures rapid evaporation.

The position of this distribution network on the wall of the casing allows rapid maintenance without shutting down the system. Each injection mechanism can be installed so as to be accessible from the outside.

The instantaneous evaporation of the water takes place at low temperature and allows the internal pressure of the heat exchanger to be controlled. This pressure is as low as possible for an evaporation temperature less than or equal to 70° C. The steam produced is drawn up mechanically by a dedicated compressor.

These characteristics aim to maintain the volume of the double wall at low pressure, which encourages the evacuation of the steam. The steam obtained under these conditions is dry, while being at a very low temperature. Compressed, it is injected into a known exchanger assembly where it acquires its temperature and operating pressure for the cogeneration.

Four excess pressure tanks (or more according to the thermal power and the quantity of steam produced) will participate in the production of superheated steam. These tanks are alternatively emptied of their superheated steam by the cogeneration apparatuses, again filled with low temperature steam by the compressor in order to acquire the "sensitive" thermal load of excess pressure, and so on.

The advantage of this cooling technique consists of maintaining the low pressures in the exchange volume of the double wall of the thermal generator. Only the tanks are subjected to the significant pressures required for the cogeneration. Their production is less costly than for the generator exchanger if it was subjected to the very high pressures required for the cogeneration. Maintenance is made easier and shutting down of the system is not necessary. Management of the flows allows maintenance of the exchangers to be carried out without interrupting the operation, this maintenance can be automated.

The cooling system used in the thermal recycling system according to the invention also allows optimization of the heat exchanges in the excess pressure tanks. The exchange being gas/gas, the friction and flows are optimized.

The exchange surfaces are as large as possible, the heat acquisition of perceptible heat is more rapid and the excess pressure is accelerated. The control and management of the flows are facilitated. The alternation of the state of the tanks (full or empty) guarantees a superheated steam which is regular, permanent and controlled for the cogeneration apparatuses.

The function of the cogeneration system used in the thermal recycling system according to the invention is to rationally exploit the steam originating from the heat exchanger. This cogeneration system comprises, as a non-limitative embodiment:

a pressure/back pressure steam turbo-generator, and
networks of high and low pressure steam for the requirements of the thermal recycling method according to the invention.

All of the residual heat, after cogeneration, is used by the method, the technical characteristics of the system are defined based (amongst other things) on this criterion.

The electricity produced by the turbo-generator is used by the thermal recycling method according to the invention, the surplus being able to be marketed.

The qualities of the steam resulting from the thermal recycling method are exceptional, given the heat capacity released by this method, and due to the high level of temperatures reached in the system according to the invention.

Of course, the invention is not limited to the examples which have just been described and numerous variations can be applied to these examples without exceeding the scope of the invention.

The invention claimed is:

1. A thermal waste recycling system, comprising:
    means for thermal pyrolysis of waste;
    means for combustion of the non-gasified solids;
    means for combustion of thermal pyrolysis gases;
    means for thermal purification and molecular cracking;
    heat exchange means comprising condensation means and means for the concentration of elements;
    a condensation device that lowers the temperature of the gases to cause condensation of carbon dioxide in the gases;
    means for cooling down hot sections of said system; and
    means for cogeneration.

2. The system according to claim 1, further including means for dehydration of the wet waste.

3. The system according to claim 1, characterized in that it is maintained at a controlled pressure in order to prevent any gaseous concentration.

4. The system according to claim 1, characterized in that the thermal pyrolysis means includes:
    a solid-fuel furnace, with an ascending flow, comprising a grate receiving the fuel and oxidant injectors;
    a thermolysis/pyrolysis column, for heat acquisition for gasification of the volatiles contained in the waste; and
    a chamber for homogenization of the flue gases and combustible volatiles.

5. The system according to claim 4, characterized in that the solid fuel comprises end-of-life waste wood.

6. The system according to claim 4, wherein said solid fuel includes treated wood contaminated with chemical elements or compounds.

7. The system according to claim 4, wherein said oxidant injected into the furnace is oxygen.

8. The system according to claim 4, wherein said oxidant injected into the furnace is atmospheric air.

9. The system according to claim 4, wherein said solid-fuel furnace, has an ashpit arranged under the grate, to receive ash and non-gasifiable heavy metals.

10. The system according to claim 9, further comprising a hydraulic cooling system configured to cool the walls of the furnace, its grate and the walls of the ashpit.

11. The system according to claim 4, characterized in that it also comprises airtight means for supplying the furnace with solid fuel.

12. The system according to claim 4, characterized in that the thermolysis/pyrolysis column comprises tubes inclined towards the furnace and which are thermally controlled.

13. The system according to claim 12, characterized in that the inclination of the tubes is determined as a function of a desired flow velocity and the density of the materials to be burned.

14. The system according to claim 4, characterized in that it also comprises means for controlling the atmosphere inside the thermolysis/pyrolysis column.

15. The system according to claim 4, characterized in that the thermolysis/pyrolysis column is provided with a waste feed chute arranged above the grates of said column.

16. The system according to claim 15, characterized in that the waste feed chute is airtight and controlled by a forced flow of carbon dioxide.

17. The system according to claim 16, characterized in that the feed chute is also designed to receive at least one portion of the solid fuel.

18. The system according to claim 4, wherein said homogenization chamber ends in a nozzle adjusted to the required flow rates, the end of which discharges into a combustion chamber for the thermal pyrolysis gases.

19. The system according to claim 18, characterized in that it also comprises means for varying the flow rate of the gas in the nozzle.

20. The system according to claim 1 wherein said means for combustion of the thermal pyrolysis gases includes:
    a cylindrical combustion chamber having an approximately parabolic bottom in which a gas nozzle discharges, this bottom including means for injecting oxygen; and
    an afterburner downstream of the combustion chamber, ending in a duct for transferring the flue gas to the thermal purification and molecular cracking means.

21. The system according to claim 20, characterized in that the parabolic bottom is provided with a central cone.

22. The system according to claim 20, characterized in that the thermal purification and molecular cracking means includes:
    a first zone, called the thermal reactor, in the form of a chamber including two parts divided by a first inclined grate receiving solid fuel, the upper part containing an incandescent ember bed and oxygen injectors being arranged under said first grate;
    a second zone, for stabilization and expansion, in the form of a double chamber comprising two distinct compartments separated by a vertical non-continuous partition, a first compartment being constituted by the upper part situated above the first grate and communicating with the second compartment via the free opening above the partition; and
    a third zone, for afterburning, comprising a second grate inclined in an opposite direction to said first grate and below the latter, on which the fuel flows in the state of embers.

23. The system according to claim 1, wherein said heat exchange means are arranged so as to carry out a condensation of the water contained in the exhaust gas originating from the thermal purification means at low temperature and at a pressure lower than the atmospheric pressure.

24. The system according to claim 23, wherein said heat exchange means also include low pressure means arranged to keep the water contained in the exhaust gas, in the state of dry steam.

25. The system according to claim 1, wherein said means for condensation of the carbon dioxide includes a secondary exchanger, downstream of the heat recovery means, operating as an evaporator for liquid oxygen.

26. The system according to claim 2 wherein said means for dehydration of the wet waste comprise:
a closed tank for receiving the materials to be dehydrated, means for lifting up the wet materials, comprising an inclined tank, heated and maintained under a designated pressure by an extractor/compressor for drawing up the vapors and injecting them into the thermal reactor means; and
means for transferring the wet materials to a waste feed chute.

27. The system according to claim 26, characterized in that the dehydration means also comprise a screw conveyor, arranged at the base of the tank.

28. The system according to claim 26, wherein said inclined tank contains means for lifting up the wet materials, arranged such that only pre-dried materials arrive at the top of said inclined tank.

29. The system according to claim 28, wherein said lifting means comprise a conveyor belt designed to receive the pre-dried materials, this conveyor belt being micro-perforated in order to allow the passage of heated gases.

30. The system according to claim 26, wherein said dehydration means also comprise means for injecting heated gases so as to heat the lifting means and evaporate the water contained in the materials.

31. The system according to claim 26, wherein said dehydration means also comprise means for declogging the dry materials from the lifting means.

32. The system according to claim 31, wherein said declogging means include a rotating scraper which breaks up and propels the dry materials.

33. The system according to claim 26, wherein said means for transferring the wet materials includes a screw inside a space into which inert heated gas ($CO_2$) is injected.

34. The system according to claim 26, wherein said means for transferring the wet materials are arranged so as to allow a flow of said materials by gravity.

35. The system according to claim 26, wherein said cooling means are installed in the space inside a double wall provided for cooling the zones of the system in contact with the sources of heat of said system.

36. The system according to claim 35, wherein said cooling means further comprises a detector system including at least one temperature sensor configured to continuously monitor the temperature of the wall to be regulated.

37. The system according to claim 35, wherein said cooling means also comprise means for maintaining the volume of the double wall at low pressure.

38. The system according to claim 35, further comprising a plurality of excess pressure tanks for producing superheated steam, these tanks being successively emptied of their contents by the cogeneration means and again filled with steam to be subjected to excess pressure.

39. A method for thermal waste recycling, used in the system according to any one of the preceding claims, this method comprising:
a phase of thermal pyrolysis of the waste;
a phase of combustion of the thermal pyrolysis gases;
a phase of thermal purification and a molecular cracking;
a heat exchange phase comprising a phase of condensation and concentration of elements;
a phase of condensation of the $CO_2$ gas; and
a phase of cogeneration.

40. The method according to claim 39, characterized in that it also comprises a prior phase of dehydration of the wet waste.

* * * * *